(12) United States Patent
Takahashi et al.

(10) Patent No.: US 9,685,794 B2
(45) Date of Patent: Jun. 20, 2017

(54) POWER TRANSMISSION SYSTEM

(71) Applicant: Murata Manufacturing Co., Ltd., Nagaokakyo-shi, Kyoto-fu (JP)

(72) Inventors: Hironobu Takahashi, Nagaokakyo (JP); Keiichi Ichikawa, Nagaokakyo (JP); Tsuyoshi Suesada, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 285 days.

(21) Appl. No.: 14/700,673

(22) Filed: Apr. 30, 2015

(65) Prior Publication Data

US 2015/0270720 A1 Sep. 24, 2015

Related U.S. Application Data

(63) Continuation of application No. PCT/JP2013/074100, filed on Sep. 6, 2013.

(30) Foreign Application Priority Data

Dec. 28, 2012 (JP) ................................ 2012-286841

(51) Int. Cl.
*H02J 5/00* (2016.01)
*H02J 17/00* (2006.01)

(52) U.S. Cl.
CPC .............. *H02J 5/005* (2013.01); *H02J 17/00* (2013.01)

(58) Field of Classification Search
CPC .................................. H02J 50/00; H02J 50/05
See application file for complete search history.

(56) References Cited

U.S. PATENT DOCUMENTS

2009/0184950 A1   7/2009   Furuta et al.
2013/0300210 A1   11/2013   Hosotani
(Continued)

FOREIGN PATENT DOCUMENTS

JP      2008-89520 A    4/2009
JP      2009-169327 A   7/2009
(Continued)

OTHER PUBLICATIONS

International Search Report for PCT/JP2013/074100, date of mailing Oct. 29, 2013.
(Continued)

*Primary Examiner* — Jeffrey Zweizig
(74) *Attorney, Agent, or Firm* — Arent Fox LLP

(57) ABSTRACT

When power transmitting electrodes of a power transmitting apparatus are respectively facing power receiving electrodes of a power receiving apparatus, a composite resonant circuit including a series resonant circuit and a parallel resonant circuit is formed through a compound capacitance formed between the power transmitting electrodes and the power receiving electrodes. In a predetermined mutually facing state in which the compound capacitance becomes maximum, the impedances of the configuration components of the composite resonant circuit are set such that a resonant frequency at which the impedance of the composite resonant circuit from a signal generator side when inputs of a load circuit is short-circuited becomes locally minimum, becomes higher than a resonant frequency at which the impedance of the composite resonant circuit as seen from the signal generator side when the inputs of the load circuit are open becomes locally maximum.

18 Claims, 6 Drawing Sheets

(56) References Cited

U.S. PATENT DOCUMENTS

2014/0354075 A1* 12/2014 Suesada .................. H02J 5/005
 307/104
2015/0249483 A1* 9/2015 Ichikawa ................ H02J 5/005
 320/108

FOREIGN PATENT DOCUMENTS

JP 2011-083132 A 4/2011
WO WO 2012/101907 A1 8/2012

OTHER PUBLICATIONS

Written Opinion of the International Searching Authority for PCT/JP2013/074100, date of mailing Oct. 29, 2013.

* cited by examiner

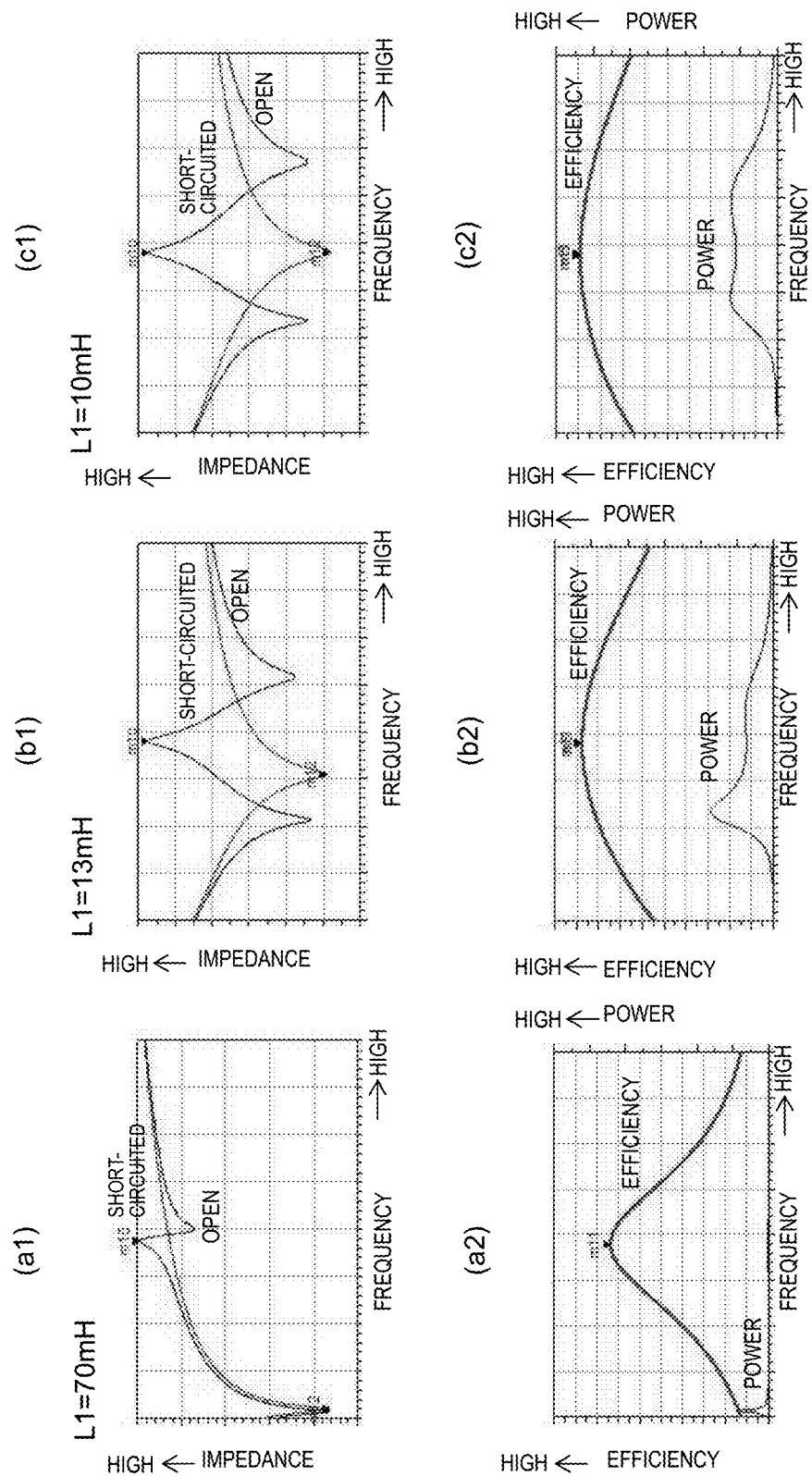

POWER TRANSMISSION SYSTEM

CROSS-REFERENCE TO RELATED APPLICATIONS

The present application is a continuation of PCT/JP2013/074100 filed Sep. 6, 2013, which claims priority to Japanese Patent Application No. 2012-286841, filed Dec. 28, 2012, the entire contents of each of which are incorporated herein by reference.

FIELD OF THE INVENTION

The present invention relates to a power transmission system in which power is transmitted from a power transmitting apparatus to a power receiving apparatus by using an electric field coupling method.

BACKGROUND OF THE INVENTION

Patent Document 1 discloses an electric-field coupling (non-contact) power transmission system (power supply system) that includes a power transmitting apparatus (fixed body) and a power receiving apparatus (movable body). This power transmission system includes a series resonant circuit and a parallel resonant circuit formed of a power transmitting apparatus and a power receiving apparatus. It has been disclosed that power can be supplied with high efficiency by making a series resonant frequency based on the series resonant circuit be the same as a parallel resonant frequency based on the parallel resonant circuit.

Patent Document 1: Japanese Unexamined Patent Application Publication No. 2009-89520

When a position on a power transmitting apparatus at which a power receiving apparatus is mounted is not fixed and is any position in a region having a certain area, such a configuration disclosed in Patent Document 1 may not be able to secure sufficient power transmission efficiency in some cases.

SUMMARY OF THE INVENTION

It is an object of the present invention to make it possible to secure sufficient power transmission efficiency even when a position on a power transmitting apparatus at which a power receiving apparatus is mounted is not fixed and is any position in a region having a certain area.

A power transmission system according to the present invention is a power transmission system that transmits power from a power transmitting apparatus to a power receiving apparatus using an electric field coupling method.

The power transmitting apparatus includes: at least one pair of power transmitting electrodes; a power transmitting side inductor; and a signal generator that applies an AC signal to the pair of power transmitting electrodes through the power transmitting side inductor, wherein the power transmitting side inductor and a capacitor formed between the power transmitting electrodes form a series resonant circuit.

The power receiving apparatus includes: at least one pair of power receiving electrodes; a power receiving side inductor; and a load circuit connected in parallel with the power receiving side inductor, as seen from the signal generator, wherein the inductor and the capacitor formed between the power receiving electrodes form a parallel resonant circuit.

When the power transmitting electrodes of the power transmitting apparatus are in a state of respectively facing the power receiving electrodes of the power receiving apparatus, a composite resonant circuit including the series resonant circuit and the parallel resonant circuit is formed through compound capacitance formed between the power transmitting electrodes and the power receiving electrodes, wherein, in a predetermined mutually facing state in which the compound capacitance becomes maximum, an impedance of a configuration component of the composite resonant circuit is set in such a manner that a resonant frequency at which an impedance of the composite resonant circuit as seen from the signal generator side in a state in which input ends of the load circuit are short-circuited becomes locally minimum, becomes, in the predetermined mutually facing state in which the compound capacitance becomes maximum, higher than a resonant frequency at which the impedance of the composite resonant circuit as seen from the signal generator side in a state in which the input ends of the load circuit are open becomes locally maximum.

According to the present invention, sufficient power transmission efficiency is secured even when a position on a power transmitting apparatus at which a power receiving apparatus is mounted is not fixed and is any position in a region having a certain area.

BRIEF DESCRIPTION OF DRAWINGS

FIG. 3A is a diagram illustrating an input impedance, power transmission efficiency, and an available output power in the case in which an inductor L1 of the power transmitting apparatus according to the embodiment of the present invention is changed.

DETAILED DESCRIPTION OF THE EXEMPLARY EMBODIMENTS

Embodiments of the present invention will be described.

First, the background which led to the invention will be described. A power transmitting apparatus of an electric-field coupling power transmission system includes at least one pair of power transmitting electrodes, and a power receiving apparatus includes at least one pair of power receiving electrodes. A coupling capacitance is generated as a result of the power transmitting electrodes facing the power receiving electrodes. This coupling capacitance changes in accordance with the positional relationship between the power transmitting electrodes and the power receiving electrodes in a mutually facing state. In the case where a power transmission system includes a series resonant circuit and a parallel resonant circuit and the two circuits are coupled to each other through coupling capacitance, thereby forming a composite resonant circuit, the series resonant frequency and the parallel resonant frequency change in accordance with a change in the coupling capacitance. In other words, the series resonant frequency and the parallel resonant frequency become different from each other. Hence, it becomes substantially difficult to make the series resonant frequency and the parallel resonant frequency be the same, when a position on the power transmitting apparatus at which the power receiving apparatus can be mounted is not fixed and is any position in a region having a certain area.

To cope with this problem, it is an object of the present invention to allow sufficient power transmission efficiency to be secured in a power transmission system in which a position on a power transmitting apparatus at which a power receiving apparatus can be mounted is not fixed and is specified as a region having a certain area.

The inventors of the present application, through various studies, found that by setting the impedances of the configuration components of a composite resonant circuit to predetermined impedances, high power transmission efficiency in a power transmission system can be realized and, at the same time, the deviation thereof with respect to frequency can be reduced. The details will be described hereinafter.

Configuration

Hereinafter, a power transmission system according to an embodiment of the present invention will be specifically described with reference to the drawings.

Circuit Configuration

Figure 1:
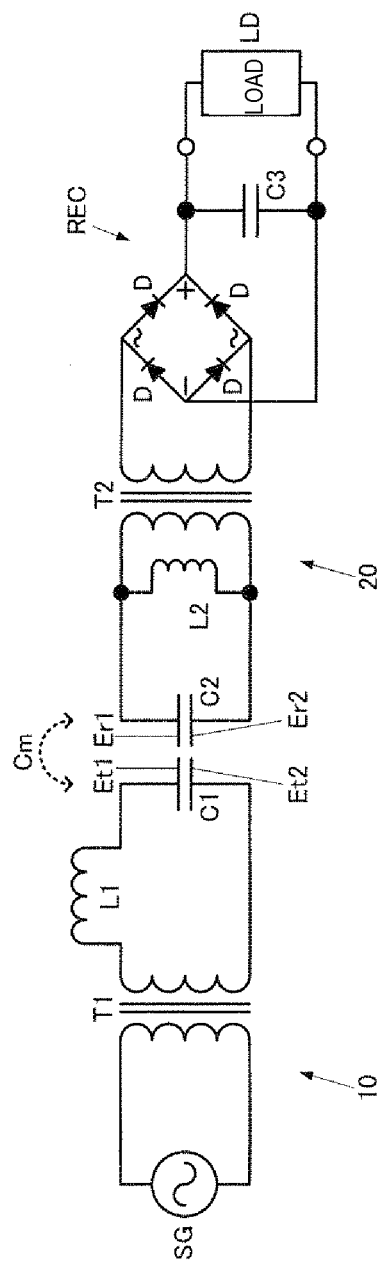
FIG. 1 is a diagram illustrating a circuit configuration of a power transmission system according to an embodiment of the present invention.

FIG. 1 is a diagram illustrating a circuit configuration of the power transmission system according to the embodiment. The power transmission system according to the embodiment is a power transmission system based on an electric field coupling method.

The power transmission system of the present embodiment includes a power transmitting apparatus 10 and a power receiving apparatus 20.

The power transmitting apparatus 10 includes a signal generator SG, a step-up transformer T1, an inductor L1, and a pair of power transmitting electrodes Et1 and Et2.

The signal generator SG generates an AC voltage having a predetermined voltage level and a predetermined frequency.

The step-up transformer T1 steps up an AC voltage generated by the signal generator SG and applies the stepped-up AC voltage between the pair of power transmitting electrodes Et1 and Et2 through the inductor L1. The inductor L1 may be a leakage inductance component of the step-up transformer T1.

The pair of power transmitting electrodes Et1 and Et2 form a capacitor C1.

The power receiving apparatus 20 includes a pair of power receiving electrodes Er1 and Er2, an inductor L2, a step-down transformer T2, a rectifier circuit REC, and a load circuit LD.

The pair of power receiving electrodes Er1 and Er2 form a capacitor C2.

When the pair of power receiving electrodes Er1 and Er2 are in a state of respectively facing the pair of power transmitting electrodes Et1 and Et2 of the power transmitting apparatus 10, a coupling capacitance Cm is generated between the pair of power receiving electrodes Er1 and Er2 and the pair of power transmitting electrodes Et1 and Et2. In this mutually facing state, when an AC voltage stepped up by the step-up transformer T1 is applied between the pair of power transmitting electrodes Et1 and Et2 of the power transmitting apparatus 10, an AC voltage is induced between the pair of power receiving electrodes Er1 and Er2 of the power receiving apparatus 20. As a result, power can be transmitted from the power transmitting apparatus 10 to the power receiving apparatus 20.

The step-down transformer T2 receives the AC voltage induced between the pair of power receiving electrodes Er1 and Er2 via the inductor L2 on the power receiving side, steps it down, and applies the stepped down voltage between the pair of input terminals of the rectifier circuit REC. The inductor L2 may be the magnetizing inductance component of the primary winding of the step-down transformer T2.

The rectifier circuit REC, which includes a plurality of diodes D and a capacitor C3, converts an input AC voltage into a DC voltage and applies it between the pair of input terminals of the load circuit LD.

The load circuit LD performs a predetermined function of the load circuit LD by using the DC voltage applied by the rectifier circuit REC.

Figure 2:
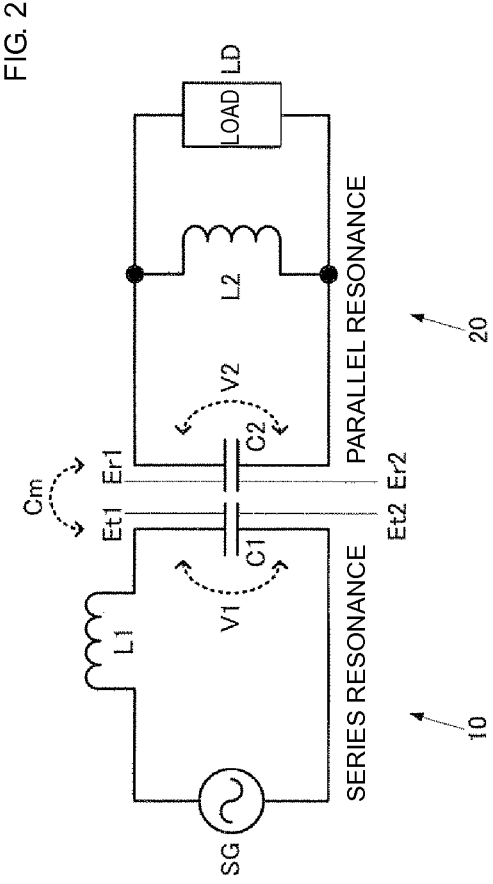
FIG. 2 is a diagram illustrating the circuit configuration of a simplified system of the power transmission system according to the embodiment of the present invention.

Note that the step-up transformer T1 and the step-down transformer T2 are not essential in an electric-field-coupling power transmission system. Further, the rectifier circuit REC is not essential in the case where the load circuit LD is an AC load circuit. FIG. 2 is a diagram illustrating the case in which the step-up transformer T1, the step-down transformer T2, and the rectifier circuit REC are not provided. In the description of the resonant circuit, for example, description will be made with reference to FIG. 2 to simplify the description. Note that in the case where the power transmitting apparatus 10 is provided with the step-up transformer T1 and the power receiving apparatus 20 is provided with the step-down transformer T2, as in the power transmission system illustrated in FIG. 1, when power is transmitted by making the pair of power transmitting electrodes Et1 and Et2 of the power transmitting apparatus 10 face the pair of power receiving electrodes Er1 and Er2 of the power receiving apparatus 20 in a predetermined mutually facing state, the intensity of an electric field between the pair of power transmitting electrodes Et1 and Et2 of the power transmitting apparatus 10 and the pair of power receiving electrodes Er1 and Er2 of the power receiving apparatus 20 can be increased. Further, power transmitted from the power transmitting apparatus 10 to the power receiving apparatus 20 can be increased.

Resonant Circuit

Referring to FIG. 2, the capacitor C1 and the inductor L1 of the power transmitting apparatus 10 form a series resonant circuit. The capacitor C2 and the inductor L2 of the power receiving apparatus 20 form a parallel resonant circuit.

In the present embodiment, in a state in which the pair of power transmitting electrodes Et1 and Et2 of the power transmitting apparatus 10 face the pair of power receiving electrodes Er1 and Er2 of the power receiving apparatus 20, a composite resonant circuit including the series resonant circuit of the power transmitting apparatus 10 and the parallel resonant circuit of the power receiving apparatus 20 is formed via the coupling capacitance Cm (compound capacitance) formed between the pair of power transmitting electrodes Et1 and Et2 and the pair of power receiving electrodes Er1 and Er2. In this case, for example, when an AC voltage V1 is applied between the pair of power transmitting electrodes Et1 and Et2, an AC voltage V2 is induced between the pair of power receiving electrodes Er1 and Er2 in accordance with the coupling capacitance Cm.

Further, in the present embodiment, in a predetermined mutually facing state in which the coupling capacitance Cm (compound capacitance) becomes maximum, the inductance (impedance) of the inductor L1 as a configuration element of the composite resonant circuit is set in such a manner that a resonant frequency at which the impedance of the composite resonant circuit as seen from the signal generator SG side in a state in which the input terminals of the load circuit LD are short-circuited becomes locally minimum, becomes, in the predetermined mutually facing state in which the coupling capacitance Cm (compound capacitance) becomes maximum, higher than a resonant frequency at which the impedance of the composite resonant circuit as seen from the signal generator SG side in a state in which the input terminals of the load circuit LD are open (state in which the load circuit LD is not connected) becomes locally maximum.

Further, in the present embodiment, in a predetermined mutually facing state in which the coupling capacitance Cm (compound capacitance) becomes maximum, the impedance of the configuration element of the composite resonant circuit is set in such a manner that a resonant frequency at which the impedance of the composite resonant circuit as seen from the signal generator SG side in a state in which the input terminals of the load circuit LD are short-circuited becomes locally minimum, becomes, in the predetermined mutually facing state in which the coupling capacitance Cm (compound capacitance) becomes maximum, higher than a resonant frequency at which the impedance of the composite resonant circuit as seen from the signal generator SG side in a state in which the input terminals of the load circuit LD are open becomes locally maximum and, in the predetermined mutually facing state in which the compound capacitance becomes maximum, becomes lower than a resonant frequency which is higher than the resonant frequency at which the impedance of the composite resonant circuit becomes locally maximum, among the resonant frequencies at which the impedance of the composite resonant circuit as seen from the signal generator SG side in a state in which the input terminals of the load circuit LD are open becomes locally minimum.

Further, in the present embodiment, the impedances of the configuration components of the composite resonant circuit are set in such a manner that the high-low relationship between the resonant frequency at which the impedance of the composite resonant circuit becomes locally maximum and the resonant frequency at which the impedance of the composite resonant circuit becomes locally minimum is satisfied, when the power transmitting electrodes Et1 and Et2 of the power transmitting apparatus 10 respectively face the power receiving electrodes Er1 and Er2 of the power receiving apparatus 20 in a predetermined position range.

Example impedance setting of configuration component of composite resonant circuit.

Example impedance setting of the configuration component of the composite resonant circuit will be described. In the present example, the inductance of the inductor L1 of the power transmitting apparatus 10 is set as an example of the impedance of the configuration component of the composite resonant circuit. This example will be described with reference to FIG. 3A and FIG. 3B.

Figure 3B:
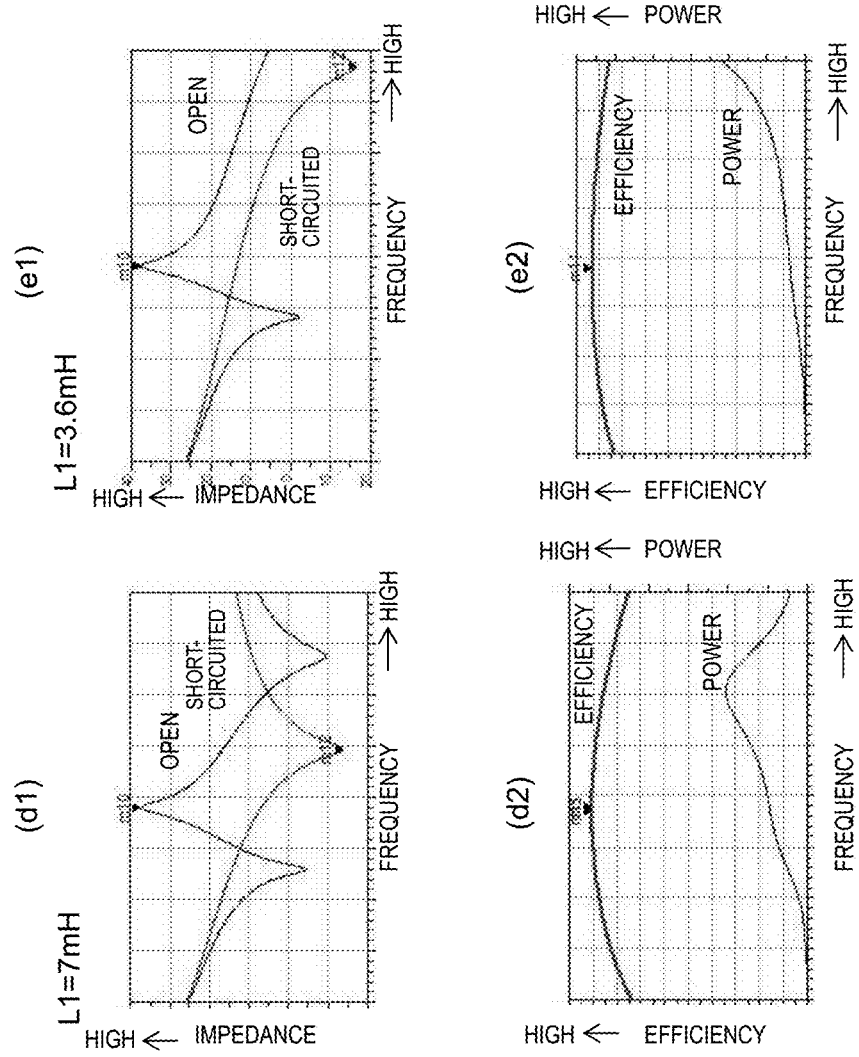
FIG. 3B is a diagram illustrating an input impedance, power transmission efficiency, and an available output power in the case in which the inductor L1 of the power transmitting apparatus according to the embodiment of the present invention is changed.

FIG. 3A(a1)-(c1) and FIG. 3B(d1)-(e1) illustrate the characteristics of the input impedances of the power receiving apparatus 20 side as seen from the signal generator SG with respect to the frequency of input AC voltage, in the power transmitting apparatus 10 illustrated in FIG. 2. FIG. 3A(a2)-(c2) and FIG. 3B(d2)-(e2) illustrate the characteristics of the power transmission efficiency and available output power with respect to the frequency of input AC voltage. Note that in the description below, these figures are simply referred to as (a1)-(e1) and (a2)-(e2). Figures (a1) to (e1) and (a2) to (e2) correspond to the cases in which the inductance of the inductor L1 of the power transmitting apparatus 10 is sequentially decreased. The input impedance of the power receiving apparatus 20 side as seen from the signal generator SG of the power transmitting apparatus 10 is the input impedance of the composite resonant circuit formed of the power transmitting apparatus 10 and the power receiving apparatus 20.

Figures (a1)-(e1) illustrate the characteristics of the input impedance in the case where input terminals tm1 and tm2 of the load circuit LD of the power receiving apparatus 20 are made to be open, in other words, in the case of being released from the load circuit LD (hereinafter, stated "at the time of being released from the load circuit LD", as appropriate) and the characteristics of the input impedance in the case where the input terminals tm1 and tm2 are short-circuited (hereinafter, stated "at the time of short-circuiting the load circuit LD", as appropriate).

At the time of short-circuiting the load circuit LD, only series resonance occurs in the composite resonant circuit formed by the power transmitting apparatus 10 and the power receiving apparatus 20, whereas no parallel resonance occurs on the power receiving apparatus 20 side. In this case, the number of resonant points decreases, compared with the time at which the load circuit LD is open, and in the examples of (a1)-(e1), only the locally minimum point of the input impedance indicated by a marker (m12) occurs.

At the time of being released from the load circuit LD, the composite resonance occurs, as described above. Hence, locally minimum points are generated at respective frequencies higher than and lower than the locally maximum point.

As the inductance of the inductor L1 of the power transmitting apparatus 10 is decreased, the frequency of the locally minimum point of the input impedance at the time of short-circuiting the load circuit LD increases. Further, as illustrated in (a2)-(e2), the peak value of the power transmission efficiency increases and the deviation of the power transmission efficiency with respect to frequency decreases. The available output power decreases after having increased to a certain value.

In power transmission, it is preferable that high power can be transmitted at high efficiency. In (a1)-(e1), power transmission efficiency can be increased by transmitting power in the vicinity of a frequency at which the input impedance becomes locally maximum at the time of being released from the load circuit LD. The available power can be increased by making the frequency at which the input impedance at the time of being released from the load circuit LD becomes locally maximum be close to the frequency at which the input impedance at the time of short-circuiting the load circuit LD becomes locally minimum.

As described above, when the inductance of the inductor L1 of the power transmitting apparatus 10 is reduced, the maximum value of the power transmission efficiency is increased, and the deviation with respect to frequency is decreased. Taking into consideration these points, it can be seen that the power transmission efficiency becomes high and the available power can be increased in the case of (d2), among (a2)-(e2). In non-contact and electric-field-coupling power transmission, a shift in the resonant frequency is generated, when, for example, the position of the pair of power transmitting electrodes Et1 and Et2 of the power transmitting apparatus 10 is shifted from the position of the pair of power receiving electrodes Er1 and Er2 of the power receiving apparatus 20. Taking into consideration this point, it is preferable that the deviations of the power transmission efficiency and available output power be small. Hence, (d2) is also advantageous from this point of view.

In (d2), the frequency corresponding to the locally minimum impedance at the time of short-circuiting the load circuit LD is higher. In (c2), the frequency corresponding to the locally maximum value of the impedance at the time of being released from the load circuit LD is approximately the same as the frequency corresponding to the locally minimum value of the impedance at the time of short-circuiting the load circuit LD, but the frequency corresponding to the locally minimum value of the impedance at the time of short-circuiting the load circuit LD is slightly higher. In these cases, the power transmission efficiency is high and relatively high available output power is realized. Note that in (c2), in the case where an area on the power transmitting apparatus 10 in which the power receiving apparatus 20 can be mounted is large, the power transmission efficiency and the available output power may become likely to decrease due to a change in the coupling capacitance Cm, as in (a2) and (b2). Hence, the example of (c2) is suitable for the case in which an area on the power transmitting apparatus 10 in which the power receiving apparatus 20 can be mounted is relatively narrow. However, when the frequency corresponding to the locally minimum value of the impedance at the time of short-circuiting the load circuit LD becomes high, as in (e2), it becomes difficult to receive the available output power. Hence it is preferable that the locally minimum value of the impedance at the time of short-circuiting the load circuit LD exist between the locally maximum value at the time of being released from the load circuit LD and the intermediate value between this locally maximum value and the locally minimum value of the impedance at the time of being released from the load circuit LD on the higher-frequency side.

The cases of (a1), (a2), (b1), and (b2) correspond to comparative examples. In (a1) and (b1), the frequency corresponding to the locally minimum value of the impedance at the time of short-circuiting the load circuit LD is smaller than the frequency corresponding to the locally maximum value of the impedance at the time of being released from the load circuit LD. In (a2), the deviation of the power transmission efficiency with respect to the frequency is larger than in the cases of (c2), (d2), and (e2). In (a2), the deviation of the power transmission efficiency for the frequency is further larger than in the case of (b2). Hence, when the resonant frequency changes due to a change in the coupling capacitance Cm and the like, the power transmission efficiency is more likely to decrease. Further, the available output power approaches zero.

Note that, in the present example, the frequency of an AC voltage output from the signal generator SG is set to a frequency at which the power transmission efficiency becomes maximum. This is effective in the case in which the suppliable power in the power transmission system is less than power consumed by the load circuit LD of the power receiving apparatus 20. Note that the frequency of an AC voltage output from the signal generator SG may be set to a frequency at which the suppliable power in the power transmission system becomes maximum. This is effective in the case in which the suppliable power in the power transmission system needs to be as high as possible, as in the case in which the power consumption of the load circuit LD of the power receiving apparatus 20 is high.

SUMMARY

The power transmission system according to the present invention is a power transmission system that transmits power from the power transmitting apparatus 10 to the power receiving apparatus 20 using an electric field coupling method, wherein the power transmitting apparatus 10 includes: at least one pair of the power transmitting electrodes Et1 and Et2; the power transmitting side inductor L1; and the signal generator SG that applies an AC signal to the pair of power transmitting electrodes Et1 and Et2 through the power transmitting side inductor L1, wherein the capacitor C1 formed between the power transmitting electrodes Et1 and Et2 and the power transmitting side inductor L1 form a series resonant circuit, wherein the power receiving apparatus 20 includes: at least one pair of the power receiving electrodes Er1 and Er2; the power receiving side inductor L2; and the load circuit LD connected in parallel with the power receiving side inductor L2, wherein the capacitor C2 formed between the power receiving electrodes Er1 and Er2 and the power receiving side inductor L2 form a parallel resonant circuit, wherein, when the power transmitting electrodes Et1 and Et2 of the power transmitting apparatus 10 are in a state of respectively facing the power receiving electrodes Er1 and Er2 of the power receiving apparatus 20, a composite resonant circuit including a series resonant circuit and a parallel resonant circuit is formed through the coupling capacitance Cm (compound capacitance) formed between the power transmitting electrodes Et1 and Et2 and the power receiving electrodes Er1 and Er2, wherein, in a predetermined mutually facing state in which the coupling capacitance Cm (compound capacitance) becomes maximum, the impedances of the configuration components of the composite circuit are set in such a manner that a resonant frequency at which the impedance of the composite resonant circuit as seen from the signal generator SG side in a state in which the input terminals of the load circuit LD are short-circuited becomes locally minimum, becomes, in the predetermined mutually facing state in which the compound capacitance becomes maximum, higher than a resonant frequency at which the impedance of the composite resonant circuit as seen from the signal generator SG side in a state in which the input terminals of the load circuit LD are open becomes locally maximum.

With this configuration, sufficient power transmission efficiency can be secured even when a position on the power transmitting apparatus 10 at which the power receiving apparatus 20 is mounted changes in a region with a predetermined area on the power transmitting apparatus 10.

In this manner, according to the present embodiment, sufficient power transmission efficiency can be secured even when a position on the power transmitting apparatus 10 at which the power receiving apparatus 20 can be mounted is not fixed and is any position in a region with a predetermined area.

Further, in the present embodiment, the impedances of the configuration components of the composite circuit are set in such a manner that, in the predetermined mutually facing state in which the compound capacitance becomes maximum, a resonant frequency at which the impedance of the composite resonant circuit as seen from the signal generator SG side in a state in which the input ends of the load circuit LD are short-circuited becomes locally minimum, becomes, in the predetermined mutually facing state in which the compound capacitance becomes maximum, higher than a resonant frequency at which the impedance of the composite resonant circuit as seen from the signal generator SG side in a state in which the input ends of the load circuit LD are open becomes locally maximum and further, in the predetermined mutually facing state in which the compound capacitance becomes maximum, becomes lower than a resonant frequency that is higher than the resonant frequency at which the impedance of the composite resonant circuit becomes locally maximum, among resonant frequencies at which the impedance of the composite resonant circuit as seen from the signal generator SG side in a state in which the input ends of the load circuit LD are open becomes locally minimum.

With this configuration, sufficient power transmission efficiency can be secured while securing approximately constant available output power.

Further, in the present embodiment, the impedances of the configuration components are set in such a manner that the high-low relationship between the resonant frequency at which the impedance of the composite resonant circuit becomes locally maximum and the resonant frequency at which the impedance of the composite resonant circuit becomes locally minimum is satisfied, in a state in which the power transmitting electrodes Et1 and Et2 of the power transmitting apparatus 10 are respectively facing the power receiving electrodes Er1 and Er2 of the power receiving apparatus 20 in a predetermined position range.

With this configuration, even when the positional relationship between the power receiving apparatus 20 and the power transmitting apparatus 10 changes in a predetermined position range, the high-low relationship between the resonant frequency at which the impedance of the composite resonant circuit becomes locally maximum and the resonant frequency at which the impedance of the composite resonant circuit becomes locally minimum is satisfied, whereby sufficient power transmission efficiency can be secured.

In the present embodiment, the inductance (impedance) of the inductor L1 as a configuration component of the composite resonant circuit may be set. Alternatively, the impedance of a configuration component other than the inductor L1 may be set.

Specific example of power transmission system.

Figure 4:
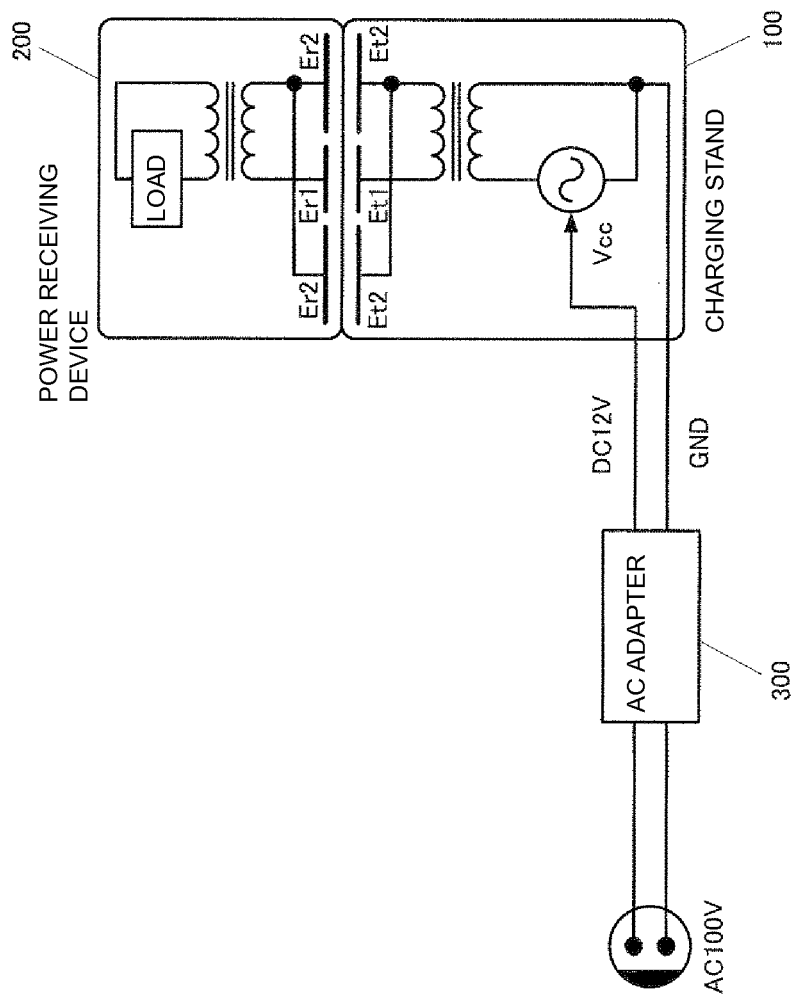
FIG. 4 is a diagram illustrating a specific example of the power transmission system according to the embodiment of the present invention.

Next, a specific example of the power transmission system according to the present invention will be described. FIG. 4 is a diagram illustrating the specific example of the power transmission system according to the present invention.

The power transmission system includes a charging stand 100, a power receiving device 200, and an AC adapter 300.

The AC adapter 300 converts an AC voltage into a DC voltage, which is supplied to the charging stand 100. The AC adapter 300 converts, for example, an AC voltage of 100 V into a DC voltage of 12 V.

The charging stand 100 corresponds to the power transmitting apparatus 10 illustrated in FIG. 1. The power receiving device 200 corresponds to the power receiving apparatus 20 illustrated in FIG. 1. The specific configurations of the charging stand 100 and the power receiving device 200 will be described with reference to FIG. 5.

Figure 5:
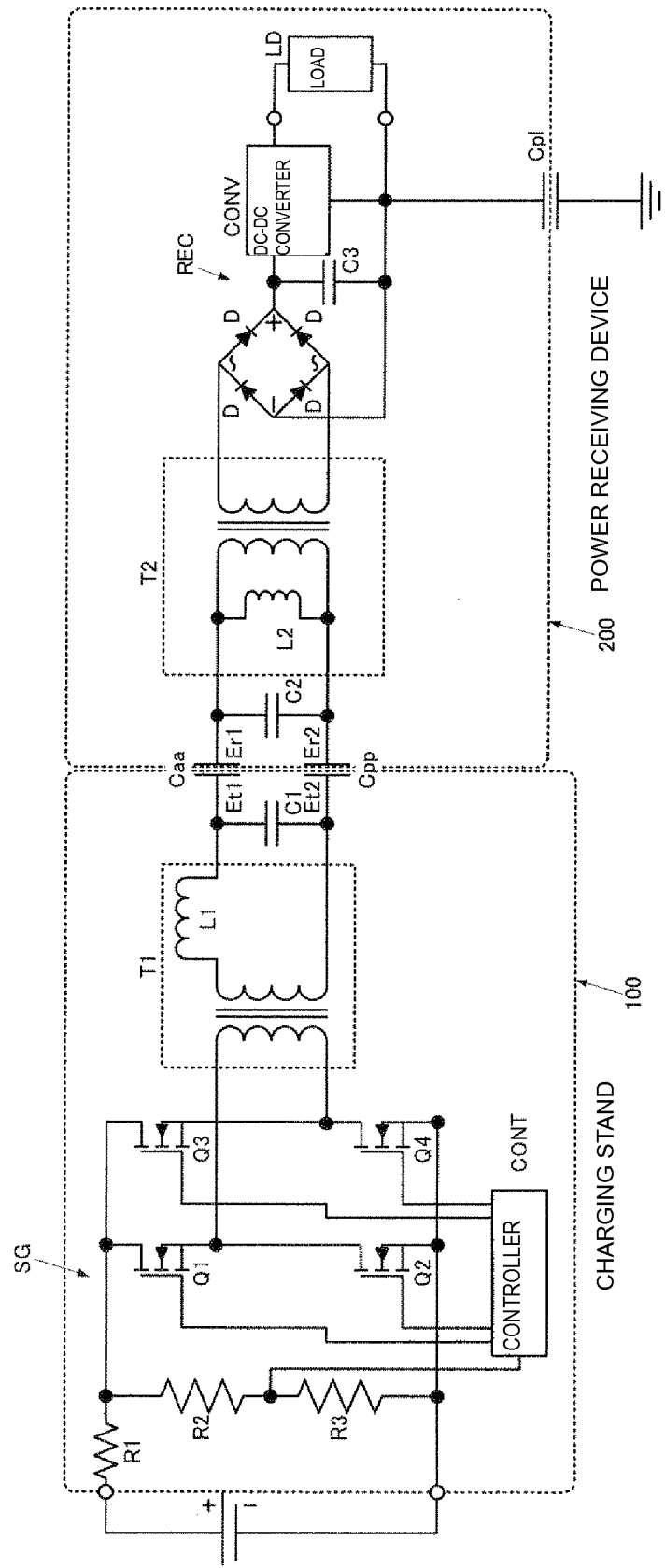
FIG. 5 is a diagram illustrating a circuit configuration of the specific example of the power transmission system according to the embodiment of the present invention.

FIG. 5 is a diagram illustrating the circuit configurations of the charging stand 100 and the power receiving device 200. In FIG. 5, components identical or corresponding to those in FIG. 1 are denoted by the same reference symbols. Descriptions of components identical to those in FIG. 1 are omitted as appropriate.

The charging stand 100 of the present specific example includes a signal generator SG, a step-up transformer T1, and a pair of power transmitting electrodes Et1 and Et2.

The signal generator SG is formed of an inverter circuit that converts a DC voltage supplied from the AC adapter 300 into an AC voltage. The signal generator SG generates, for example, an AC voltage of 100 kHz to 10 MHz. The inverter circuit includes four field effect transistors (FETs) Q1, Q2, Q3, and Q4, resistors R1, R2, and R3, and a controller CONT.

The reference potential of the charging stand 100 is connected to a ground line extending from the AC adapter 300. With this configuration, the reference potential of the charging stand 100 can be made to be the same as a ground potential. In other words, the reference potential of the charging stand 100 can be determined.

The resistor R1 limits a current flowing through the four field effect transistors (FETs) Q1, Q2, Q3, and Q4 to a predetermined current. The resistors R2 and R3 divide a DC voltage supplied from the AC adapter 300. The controller CONT receives a DC voltage divided by the resistors R2 and R3 and performs on/off control of the field effect transistors (FETs) Q1, Q2, Q3, and Q4, in such a manner that an AC voltage with a predetermined frequency and a predetermined voltage is output from the inverter circuit. As a result, an AC voltage with the predetermined frequency and predetermined voltage is applied between the input terminals of the step-up transformer T1.

The step-up transformer T1 steps up an AC voltage generated by the signal generator SG, and applies the stepped up AC voltage between the pair of power transmitting electrodes Et1 and Et2 through an inductance L1. In the present example, the inductor L1 is the leakage impedance component of the step-up transformer T1.

The power transmitting electrode Et1 forms a power transmitting side active electrode and the power transmitting electrode Et2 forms a power transmitting side passive electrode. A higher potential is applied to the power transmitting side active electrode than to the power transmitting side passive electrode. The pair of power transmitting electrodes Et1 and Et2 form a capacitor C1.

The power receiving device 200 of the present specific example includes a pair of power receiving electrodes Er1 and Er2, a step-down transformer T2, a rectifier circuit REC, a DC-DC converter CONV, and a load circuit LD.

The power receiving electrode Er1 forms a power receiving side active electrode and the power receiving electrode Er2 forms a power receiving side passive electrode. When a higher potential is applied to the power transmitting side active electrode than to the power transmitting side passive electrode, a higher potential is induced at the power receiving side active electrode than at the power receiving side passive electrode. The pair of power receiving electrodes Er1 and Er2 form a capacitor C2.

When the power transmitting electrode (power transmitting side active electrode) Et1 and the power receiving electrode (power receiving side active electrode) Er1 are in a state of being facing each other, a coupling capacitance Caa is generated between the power transmitting electrode (power transmitting side active electrode) Et1 and the power receiving electrode (power receiving side active electrode) Er1 and a coupling capacitance Cpp is generated between the power transmitting electrode (power transmitting side passive electrode) Et2 and the power receiving electrode (power receiving side passive electrode) Er2. When the power transmitting electrode (power transmitting side active electrode) Et1 and the power receiving electrode (power receiving side active electrode) Er1 are in a state of being facing each other, an AC voltage is induced between the pair of power receiving electrodes Er1 and Er2 of the power receiving device 200 as a result of an AC voltage stepped-up by the step-up transformer T1 being applied to the pair of power transmitting electrodes Et1 and Et2 of the charging stand 100. As a result, power can be transmitted from the charging stand 100 to the power receiving device 200.

The step-down transformer T2 steps down the AC voltage induced between the pair of power receiving electrodes Er1 and Er2, and applies the stepped down AC voltage to the rectifier circuit REC. The step-down transformer T2 includes the inductor L2 between the input and output thereof. The inductor L2 may be the magnetizing inductance component of the primary winding of the step-down transformer T2.

The one end of the secondary winding of the step-down transformer T2 is grounded through a capacitance Cp1. Hence, the one end of the secondary winding of the step-down transformer T2 becomes a reference potential line.

The rectifier circuit REC, which includes a plurality of diodes D and a capacitor C3, converts an AC voltage applied between the pair of input terminals into a DC voltage, and applies it between the input terminals of the DC-DC converter CONV.

The DC voltage output from the rectifier circuit REC is converted by the DC-DC converter CONV into a predetermined DC voltage, for example, a DC voltage appropriate for the load circuit LD, and then output.

The load circuit LD performs the predetermined functions thereof utilizing the DC voltage output from the DC-DC converter CONV.

REFERENCE SIGNS LIST 10 power transmitting apparatus
20 power receiving apparatus
100 charging stand
200 power receiving device
300 AC adapter
Et1, Et2 power transmitting electrodes
Er1, Er2 power receiving electrodes
REC rectifier circuit
C1 capacitor
C2 capacitor
C3 capacitor
Caa coupling capacitance formed between a power transmitting side active electrode and a power receiving side active electrode
Cpp coupling capacitance formed between a power transmitting side passive electrode and a power receiving side passive electrode
Cm coupling capacitance
CONT controller
CONV DC-DC converter
D diode
L1 inductor
L2 inductor
LD load circuit
Q1, Q2, Q3, Q4 FETs
R1, R2, R3 resistors
SG signal generator
T1 step-up transformer
T2 step-down transformer

The invention claimed is:

1. A power transmission system comprising:
a power transmitting apparatus including:
a pair of first electrodes forming a first capacitor;
a first inductor coupled in series to one of the pair of first electrodes; and
a signal generator configured to apply an AC signal to the pair of power transmitting electrodes,
wherein the first inductor and the first capacitor form a series resonant circuit,
a power receiving apparatus including:
a pair of second electrodes forming a second capacitor;
a second inductor coupled in parallel to the pair of second electrodes; and
a load circuit coupled in parallel with the second inductor,
wherein the second inductor and the second capacitor form a parallel resonant circuit,
wherein, when the pair of second electrodes are positioned to face the pair of first electrodes, the series resonant circuit and the parallel resonant circuit form a composite resonant circuit through compound capacitance between the pair of first electrodes and the pair of second electrodes,
wherein a configuration component of the composite resonant circuit has an impedance such that when the pair of second electrodes are facing the pair of first electrodes in a predetermined state with the compound capacitance having a maximum value, a resonant frequency of the composite resonant circuit is higher in a first state of the power receiving apparatus than a second state of the power receiving apparatus, and
wherein the first state of the power receiving apparatus is when inputs of the load circuit are short-circuited and the second state of the power receiving apparatus is when the inputs of the load circuit are open.

2. The power transmission system according to claim 1, wherein, in the first state of the power receiving apparatus, an impedance of the composite resonant circuit becomes a minimum value from the signal generator side.

3. The power transmission system according to claim 2, wherein, in the second state of the power receiving apparatus, the impedance of the composite resonant circuit becomes a maximum value from the signal generator side.

4. The power transmission system according to claim 3, wherein configuration component of the composite resonant circuit is the first inductor of the power transmitting apparatus.

5. The power transmission system according to claim 3, wherein configuration component of the composite resonant circuit is the second inductor of the power receiving apparatus.

6. The power transmission system according to claim 3, wherein, in the predetermined state with the compound capacitance having a maximum value, the resonant frequency of the composite resonant circuit becomes lower than a resonant frequency that is higher than the resonant frequency in the second state of the power receiving apparatus, among resonant frequencies in the first state of the power receiving apparatus.

7. The power transmission system according to claim 3, wherein the impedance of the configuration component of the composite circuit is set such that a high-low relationship between the resonant frequency at which the impedance of the composite resonant circuit becomes locally maximum and the resonant frequency at which the impedance of the composite resonant circuit becomes locally minimum is satisfied in a state in which the pair of first electrodes are respectively facing the pair of second electrodes in a predetermined position range.

8. The power transmission system according to claim 1, wherein the power transmitting further includes a step-up transformer coupled between the signal generator and the pair of first electrodes with the first inductor disposed therebetween.

9. The power transmission system according to claim 8, wherein the power receiving further includes a step-down transformed coupled in parallel to the second inductor.

10. The power transmission system according to claim 9, wherein the power receiving further includes a rectifier circuit coupled in parallel to the step-down transformer.

11. The power transmission system according to claim 10, wherein the power receiving further a third capacitor coupled in parallel between the rectifier circuit and the load.

12. A method of transmitting power from a power transmitting apparatus including a pair of first electrodes forming a first capacitor, a first inductor coupled in series to one of the pair of first electrodes, and a signal generator configured to apply an AC signal to the pair of power transmitting electrodes, to a power receiving apparatus including a pair of second electrodes forming a second capacitor, a second inductor coupled in parallel to the pair of second electrodes, and a load circuit coupled in parallel with the second inductor, the method comprising:
   forming a composite resonant circuit through compound capacitance between the pair of first electrodes and the pair of second electrodes when the pair of second electrodes are positioned to face the pair of first electrodes; and
   setting an impedance of a configuration component of the composite resonant circuit such that when the pair of second electrodes are facing the pair of first electrodes in a predetermined state with the compound capacitance having a maximum value, a resonant frequency of the composite resonant circuit is higher in a first state of the power receiving apparatus than a second state of the power receiving apparatus,
   wherein the first state of the power receiving apparatus is when inputs of the load circuit are short-circuited and the second state of the power receiving apparatus is when the inputs of the load circuit are open.

13. The method of transmitting power according to claim 12, wherein, in the first state of the power receiving apparatus, an impedance of the composite resonant circuit becomes a minimum value from the signal generator side.

14. The method of transmitting power according to claim 13, wherein, in the second state of the power receiving apparatus, the impedance of the composite resonant circuit becomes a maximum value from the signal generator side.

15. The method of transmitting power according to claim 14, wherein configuration component of the composite resonant circuit is the first inductor of the power transmitting apparatus.

16. The method of transmitting power according to claim 14, wherein configuration component of the composite resonant circuit is the second inductor of the power receiving apparatus.

17. The method of transmitting power according to claim 14, further comprising setting the impedance of a configuration component of the composite resonant circuit such that the resonant frequency of the composite resonant circuit becomes lower than a resonant frequency that is higher than the resonant frequency in the second state of the power receiving apparatus, among resonant frequencies in the first state of the power receiving apparatus.

18. The method of transmitting power according to claim 14, further comprising setting the impedance of the configuration component of the composite circuit such that a high-low relationship between the resonant frequency at which the impedance of the composite resonant circuit becomes locally maximum and the resonant frequency at which the impedance of the composite resonant circuit becomes locally minimum is satisfied in a state in which the pair of first electrodes are respectively facing the pair of second electrodes in a predetermined position range.

* * * * *